US010866654B1

(12) United States Patent
Peterson et al.

(10) Patent No.: US 10,866,654 B1
(45) Date of Patent: Dec. 15, 2020

(54) PRESENTATION OF INDICATION OF LOCATION OF MOUSE CURSOR BASED ON JIGGLING OF MOUSE CURSOR

(71) Applicant: Lenovo (Singapore) Pte. Ltd., Singapore (SG)

(72) Inventors: Nathan J. Peterson, Oxford, NC (US); Russell Speight VanBlon, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/554,601

(22) Filed: Aug. 28, 2019

(51) Int. Cl.
*G06F 3/0354* (2013.01)

(52) U.S. Cl.
CPC .................. *G06F 3/03543* (2013.01)

(58) Field of Classification Search
CPC .......... G06F 3/03; G06F 3/03543; G09G 5/08
See application file for complete search history.

(56) References Cited

U.S. PATENT DOCUMENTS

| 5,473,343 A * | 12/1995 | Kimmich | G06F 3/04812 715/860 |
| 6,597,383 B1 * | 7/2003 | Saito | G06F 3/04812 345/157 |
| 7,142,192 B2 * | 11/2006 | De Waal | G06F 3/038 345/157 |
| 8,508,470 B2 * | 8/2013 | Moscovitch | G06F 3/0219 345/156 |
| 2002/0075230 A1 * | 6/2002 | Okuda | G06F 3/04892 345/157 |
| 2004/0237053 A1 * | 11/2004 | Impas | G06F 3/0481 715/856 |
| 2007/0200791 A1 * | 8/2007 | Meyers | G06F 3/1446 345/1.1 |
| 2012/0327104 A1 * | 12/2012 | Schrauben | G01C 23/00 345/619 |
| 2016/0313804 A1 * | 10/2016 | Neisler | G06F 3/013 |
| 2016/0357398 A1 * | 12/2016 | Frem | G09G 5/08 |
| 2016/0378295 A1 * | 12/2016 | Cousins | G06F 3/04812 715/702 |

* cited by examiner

*Primary Examiner* — Sardis F Azongha
(74) *Attorney, Agent, or Firm* — John M. Rogitz; John L. Rogitz

(57) ABSTRACT

In one aspect, a device includes at least one processor, at least one display accessible to the at least one processor, and storage accessible to the at least one processor. The storage includes instructions executable by the at least one processor to identify jiggling or other back and forth movement of a mouse cursor. The instructions are also executable to, based on the identification, present at least one indication on the at least one display of a current location on the at least one display of the mouse cursor. The at least one indication includes something other than the mouse cursor itself.

20 Claims, 8 Drawing Sheets

PRESENTATION OF INDICATION OF LOCATION OF MOUSE CURSOR BASED ON JIGGLING OF MOUSE CURSOR

FIELD

The present application relates to technically inventive, non-routine solutions that are necessarily rooted in computer technology and that produce concrete technical improvements.

BACKGROUND

As recognized herein, many people use more than one electronic display when interacting with a computing device. However, as also recognized herein, it can be difficult for a user who wishes to begin using his or her computing device after a break to identify the current location of the device's mouse cursor, even by movement of the mouse cursor itself, given the large scale of many of these electronic displays. There are currently no adequate solutions to the foregoing computer-related, technological problem.

SUMMARY

Accordingly, in one aspect a device includes at least one processor, at least one display accessible to the at least one processor, and storage accessible to the at least one processor. The storage includes instructions executable by the at least one processor to identify jiggling of a mouse cursor. The instructions are also executable to, based on the identification, present at least one indication on the at least one display of a current location on the at least one display of the mouse cursor. The at least one indication includes something other than the mouse cursor itself.

In some examples, the jiggling may include back and forth movement of the mouse cursor.

Also in some examples, the at least one indication may include at least one graphical object such as a circle that animates to reduce its radius around a center of the circle, where the center of the circle may be established by at least a portion of the mouse cursor. In some examples, the at least one graphical object may even include plural concentric circles of different radii that together either animate to expand their radii about a center established by at least a portion of the mouse cursor or animate to reduce their radii about a center established by at least a portion of the mouse cursor.

Additionally or alternatively, the at least one graphical element may include at least one arrow different from the mouse cursor and that is larger than the mouse cursor. The at least one arrow may flash between presentation and non-presentation on the at least one display, and/or may be presented in a first color different from one or more colors in which the mouse cursor is presented.

Additionally, in some implementations the instructions may be executable by the at least one processor to receive input from a camera in communication with the at least one processor and identify, based on the input from the camera, a location of the at least one display at which the user is looking. The instructions may also be executable to, responsive to the identification of the jiggling of the mouse cursor, identify the current location of the mouse cursor. The instructions may then be executable to determine, based on the location of the at least one display at which the user is looking, whether the user is looking at a display location at least within a threshold distance of the current location of the mouse cursor. Responsive to a determination that the user is looking at a display location at least within the threshold distance of the current location of the mouse cursor, the instructions may be executable to decline to present the at least one indication. Responsive to a determination that the user is looking at a display location outside of the threshold distance of the current location of the mouse cursor, the instructions may be executable to present the at least one indication. The device may even include the camera and/or an input device that controls the mouse cursor.

Also, if desired in some implementations the at least one display may include discrete first and second displays and the instructions may be executable by the at least one processor to receive input from a camera in communication with the at least one processor. The instructions may also be executable to identify that the user is looking at the first display based on the input from the camera and to identify that the mouse cursor is currently being presented on the second display. The instructions may then be executable to present the at least one indication on the second display responsive to identification of movement of the mouse cursor and based on the identifications that the user is looking at the first display and that the mouse cursor is currently being presented on the second display. In some examples, the movement of the mouse cursor may not include jiggling.

Still further, in some implementations the at least one display may again include discrete first and second displays, the mouse cursor may be currently presented on the first display, and the instructions may be executable by the at least one processor to highlight a border of the first display based on the identification. The highlighting of the border may establish the at least one indication and/or be performed in addition to presentation of at least one graphical object that at least in part establishes the at least one indication.

In another aspect, a method includes identifying back and forth movement of a pointer presented on at least one display and, based on the identifying, presenting at least one indication on the at least one display of a current location of the pointer on the at least one display. The at least one indication includes something other than the pointer itself.

In some examples, the method may also include identifying that the user is looking at a first display of at least first and second displays that are different from each other, with the pointer being currently presented on one of the first and second displays. In these examples, the method may also include declining to present the at least one indication responsive to identifying that the user is looking at the same display on which the pointer is presented, and presenting the at least one indication responsive to identifying that the user is looking at a different display than the one on which the pointer is presented.

In still another aspect, a computer readable storage medium that is not a transitory signal includes instructions executable by at least one processor to identify back and forth movement of at least part of an input device accessible to the at least one processor. The instructions are also executable to, based on the identification, present at least one graphical element on a display that indicates a current location of a pointer on the display. The at least one graphical element includes something other than the pointer itself.

The details of present principles, both as to their structure and operation, can best be understood in reference to the accompanying drawings, in which like reference numerals refer to like parts, and in which:

DETAILED DESCRIPTION

Figure 1:
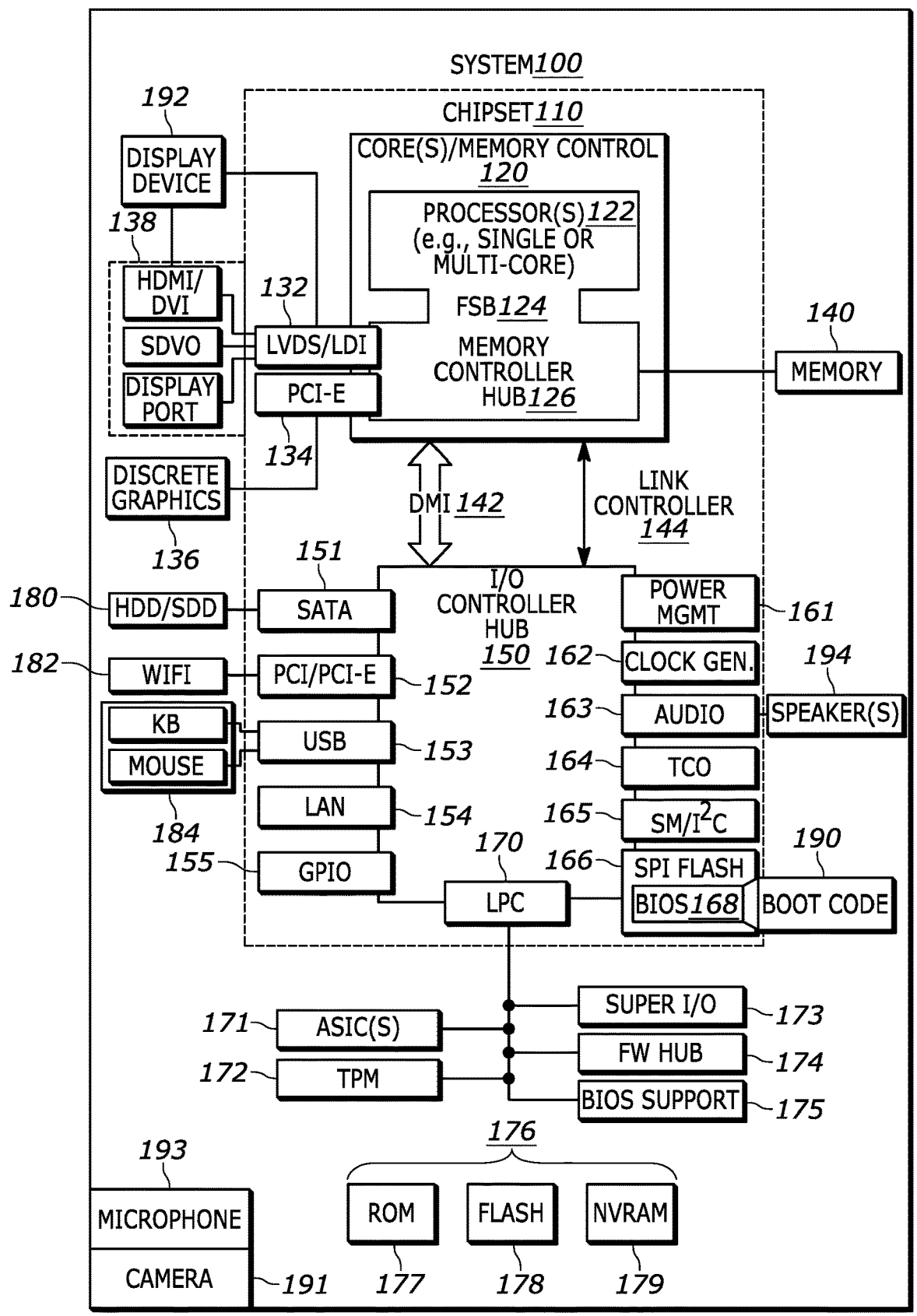
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, in some examples the system 100 may include a camera 191 that gathers one or more images and provides input related thereto to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, in some examples the camera may be coupled to the display device 192 and face a same direction as a screen of the display device 192 on which images and other content are presentable in order to image the face of a user while viewing the display device 192 consistent with present principles.

Still further, the system 100 may include an audio receiver/microphone 193 that provides input from the microphone to the processor 122 based on audio that is detected, such as via a user speaking or providing audible input to the microphone consistent with present principles.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
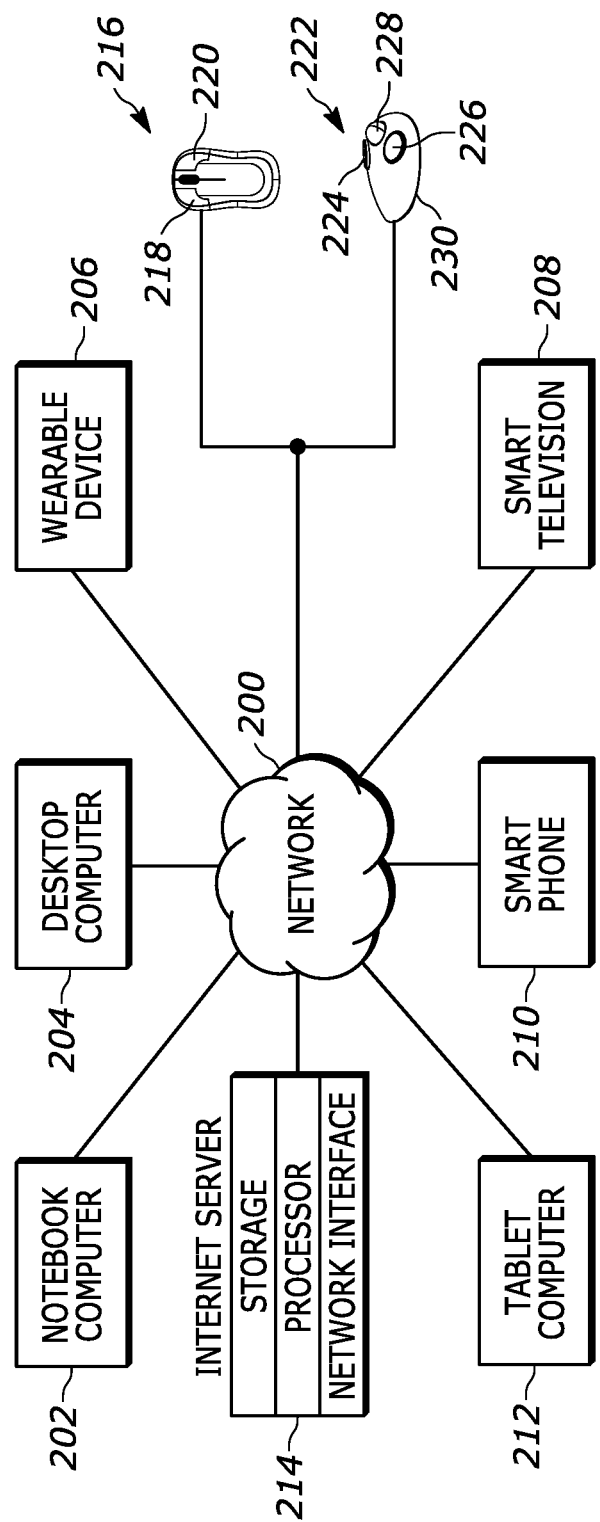
FIG. 2 is a block diagram of an example network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212.

The network 200 may also include one or more input devices accessible to the other devices 202-214, such as a wired or wireless mouse 216 having a left click button 218, right click button 220, a scroll wheel (not shown), and ball on its underside (not shown) to control movement of a mouse cursor or pointer consistent with present principles by moving the mouse 216 across a surface to thus roll the ball itself across the surface, which may be detected by an optical sensor within the mouse (not shown). The one or more input devices may also include a track ball input device 222 with a left click button 224 and right click button 226 as well as a top-facing track ball 228 that may move with respect to a base 230 of the device 222 under control of a user to control movement of a mouse cursor or pointer consistent with present principles, even if the base 230 itself remains stationary.

Note that either one of the input devices 216, 222 may establish an input device to move a pointer or mouse cursor consistent with present principles, though other types of input devices also useable for controlling motion of a pointer/mouse cursor may also be used. Also note that the devices 202-216, 222 may be configured to communicate with each other over the network 200 to undertake present principles.

Figure 3:
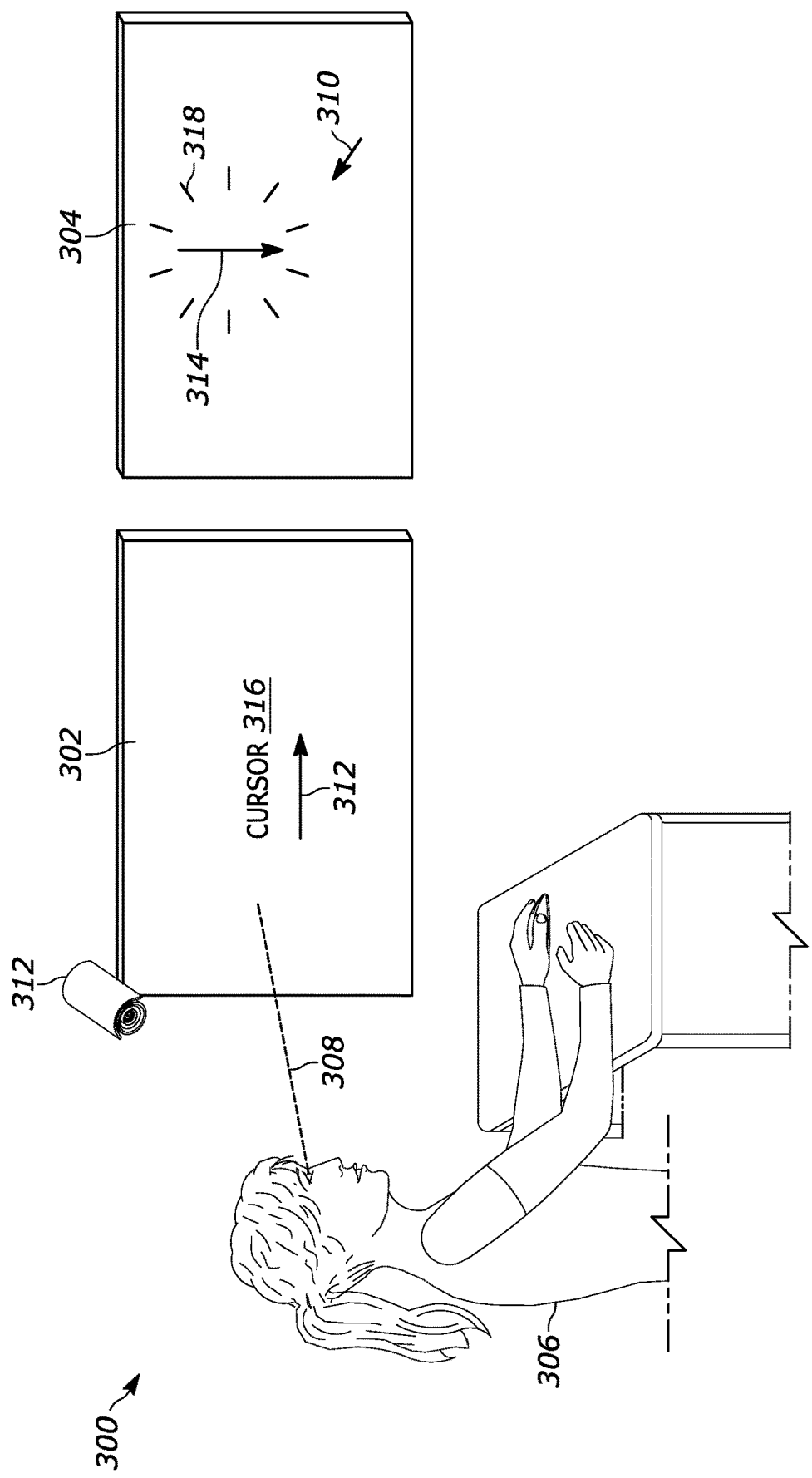
FIG. 3 shows a perspective view of user in front of two displays and attempting to find the current location of a mouse cursor consistent with present principles.
Figure 4:
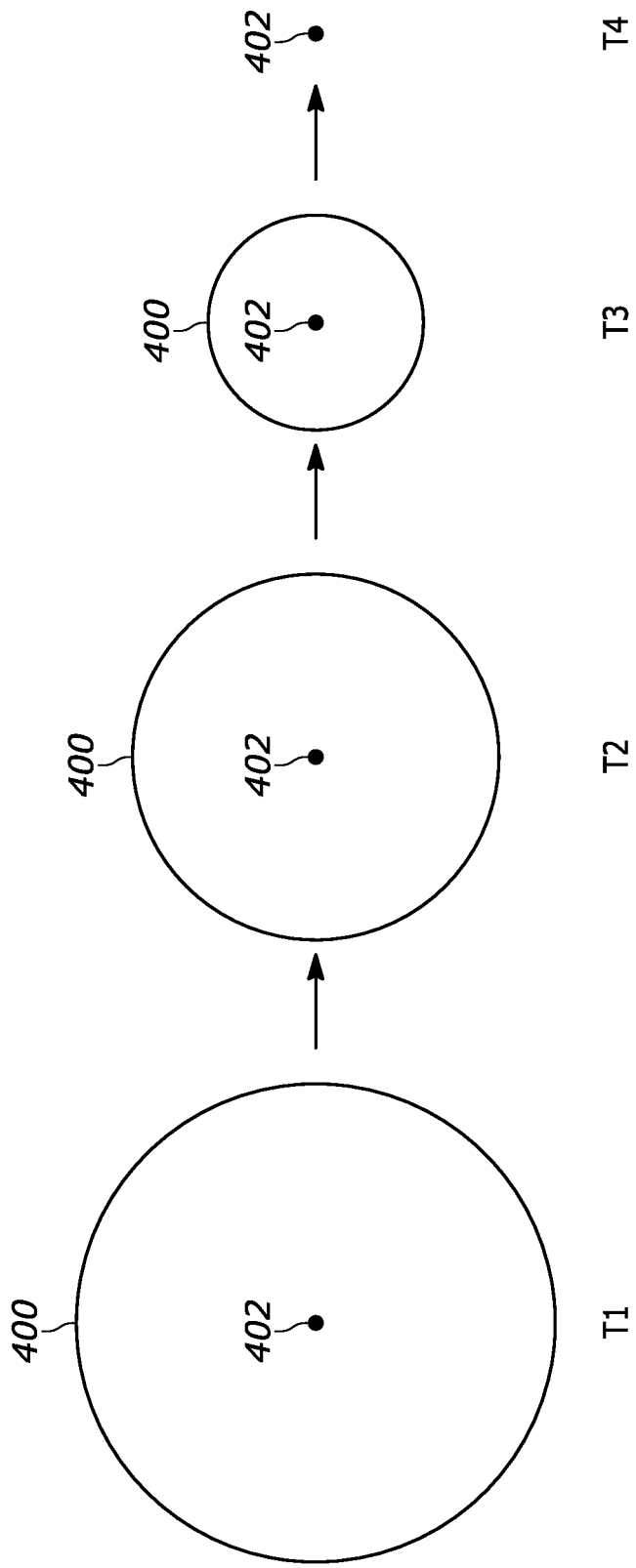
FIGS. 4-7 show example indications of the current location of a mouse cursor consistent with present principles.

Referring to FIG. 3, it shows an example environment 300 such as an office or residential setting. A first discrete display 302 and a second discrete display 304 are shown and are controllable by a computing device (not shown) such as a desktop computer, laptop computer, tablet, smart phone, the system 100, etc. As also shown in FIG. 3, a user 306 is sitting in front of the displays 302, 304 and directing his or her line of sight 308 toward the display 302 in an attempt to visually locate a mouse cursor or pointer 310 that is currently presented on the other display 304. Note that the mouse cursor or pointer 310 is controllable by an input device to move about the displays 302, 304 and to select various objects presented thereon as well as to provide other user input.

A camera 312 is also shown in FIG. 3 as being mechanically coupled to the display 302, with the camera 312 also being accessible to the computing device. Input from the camera 312 that indicates the user's line of sight may be used by the computing device along with eye tracking software to identify the line of sight 308 and thus a location on the display 302 at which the user is looking. Based on the computing device identifying that the user is jiggling the mouse cursor 310 and/or the associated input device itself (or a component thereof such as the track ball 228), and based on the computing device identifying that the user is not looking at the display 304 on which the mouse cursor 310 is presented, one or more indications may be presented that indicate a current location of the mouse cursor 310. For example, graphical objects such as a first arrow 312 and second arrow 314 as well as text 316 indicating "cursor" may be presented.

It may be appreciated from FIG. 3 that the arrow 312 is presented on the display 302 at which the user is looking and points toward the display 304 on which the mouse cursor 310 is currently presented, with the text 316 further highlighting this by indicating the word "cursor" above the arrow 312. It may also be appreciated from FIG. 3 that the arrow 314 is presented on the display 304 and, more than that, points toward the current location on the display 304 of the mouse cursor 310. Note that both of the arrows 312 and 314 are different from the mouse cursor 310 itself and are presented larger than the mouse cursor 310 itself. Also note that lines 318 illustrate that in some examples the arrow 314 may flash between presentation and non-presentation on the display 304 to further draw the attention of the user 306 to the current location of the mouse cursor 310. The arrow 312 may similarly flash, and indeed one or both of the arrows 312, 314 may be presented in one or more colors different from any colors in which the mouse cursor 310 itself is presented and possibly in different colors from each other as well. For example, the arrow 312 may be presented in red color to indicate that the user 306 is looking at the wrong display to determine the current location of the mouse cursor 310, while the arrow 314 may be presented in green color to indicate the correct display, and while the mouse cursor 310 itself may be presented in black.

Before moving on in the detailed description, it is to be understood that in at least some embodiments, jiggling may be established by a user moving a mouse cursor or pointer, and/or the input device or track ball itself, back and forth between at least two directions with changes in direction occurring at least within a threshold non-zero time of each other. The threshold time may be relatively short such as, for example, half a second. This may improve the functioning of the computing device in that a jiggle may not be confused by the device with other relatively fast (or not) non-conforming input to control the mouse cursor.

FIGS. 4-7 show other example indications of a current display location of a mouse cursor or pointer that may be presented on a display consistent with present principles. Beginning first with FIG. 4, a circle 400 is shown that animates to progressively reduce its radius around a center 402 of the circle at different times, as demonstrated by times T1, T2, and T3 as shown. Note that the center 402 of the circle 400 is established by and/or located at a portion of a mouse cursor itself (not shown), such as its central point. Also note that at time T4 the circle 400 terminates in the center 402 and, responsive to the circle 400 terminating, another circle may similarly be presented and begin reducing its radius.

Further note that in other embodiments, the circle 400 may do the opposite in that it may begin at the center 402 and progressively expand its radius until it reaches a threshold radius, at which point the circle 402 may fade away and another circle may similarly begin from the center 402. But whether the circle 400 progressively expands its radius or reduces its radius, this animation may continue, e.g., until a threshold non-zero amount of time expires or until the user is identified as looking at the mouse cursor, looking within a threshold display distance of the mouse cursor, looking at the correct display on which the mouse cursor is presented, etc.

Figure 5:
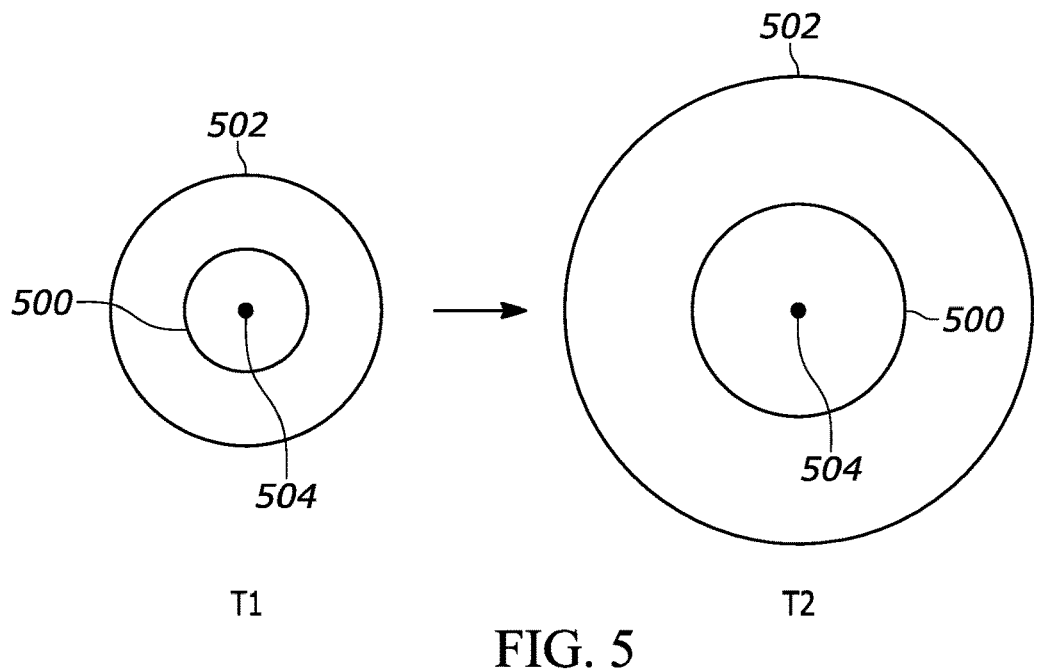

FIG. 5 shows another example. In FIG. 5, plural concentric circles 500, 502 of different radii are shown and together animate to progressively expand their radii at the same rate about a center 504 established by at least a portion of a mouse cursor (not shown). The circles 500, 502 as illustrated at different times T1 and T2 demonstrate this, and also note that once each circle 500, 502 reaches a radius of more than a threshold relative to the center 504, the respective circle may fade away and no longer be presented on the display. Further note that once one of the circles 500, 502 fades away, other circles may begin at the center 504 and similarly progressively expand their respective radii until they too reach the threshold radius. What's more, note that the circles 500, 502 themselves may have similarly began at the center 504 for outward expansion. Accordingly, once an outer-most circle fades away, another circle may begin expanding from the center 504.

Also note that according to this example more than two circles may be presented at any given time in some implementations. In any case, this animation as demonstrated by FIG. 5 may continue, e.g., until a threshold non-zero amount of time expires or until the user is identified as looking at the mouse cursor, looking within a threshold display distance of the mouse cursor, looking at the correct display on which the mouse cursor is presented, etc.

Figure 6:
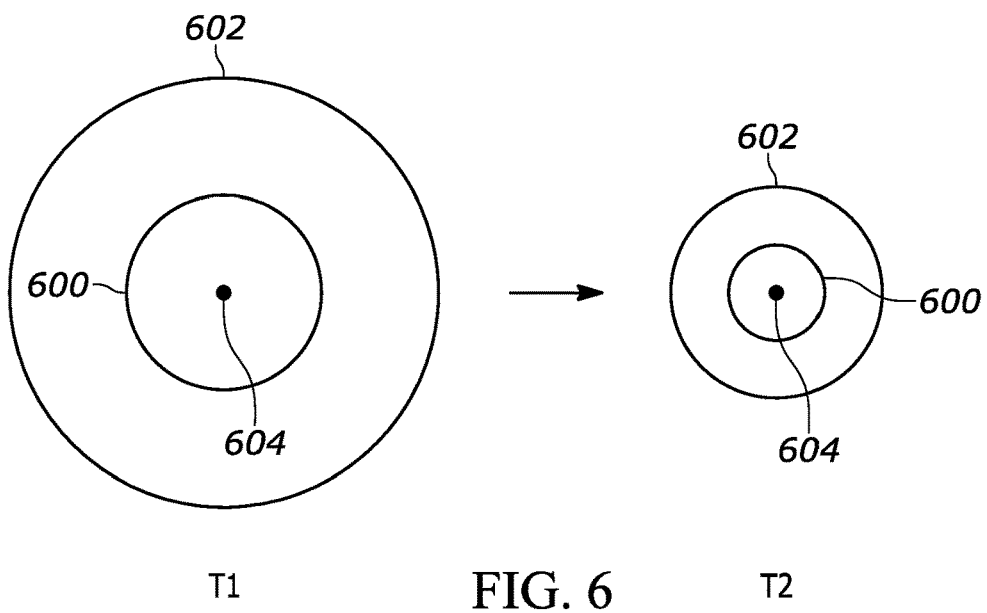

FIG. 6 shows another example indication consistent with present principles. In FIG. 6, plural concentric circles 600, 602 of different radii are shown and together animate to progressively reduce their radii at the same rate about a center 604 established by at least a portion of a mouse cursor (not shown). The circles 600, 602 as illustrated at different times T1 and T2 demonstrate this, and also note that once each circle 600, 602 reduces its radius to the point where it terminates in center 604, another circle may be presented with a radius establishing it as an outer-most circle and similarly reduce its radius at the same rate until it too terminates in the center 604. What's more, note that the circles 600, 602 themselves may have similarly began as an outer-most circle. Accordingly, once one circle terminates in the center 604, another circle may be presented as an outer-most circle and begin reducing its radius until it too terminates in the center 604.

Also note that according to this example more than two circles may be presented at any given time in some implementations. In any case, this animation as demonstrated by FIG. 6 may continue, e.g., until a threshold non-zero amount of time expires or until the user is identified as looking at the mouse cursor, looking within a threshold display distance of the mouse cursor, looking at the correct display on which the mouse cursor is presented, etc.

Figure 7:
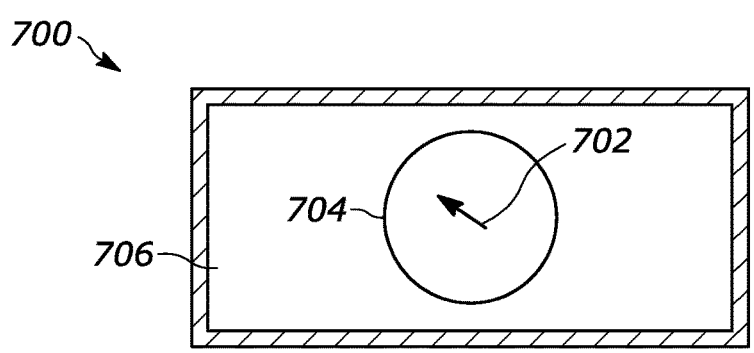

FIG. 7 shows yet another example of indications that may be presented consistent with present principles. A display 700 is shown along with a mouse cursor or pointer 702. One or more circles 704 may be presented on the display 700 with the center of the one or more circles 704 being established by the mouse cursor 702. The one or more circles 704 may animate according to any of the examples described above in reference to FIGS. 4-6.

FIG. 7 also shows that a border 706 of the display 700 may be presented with highlighting such as a certain shading or a certain bright color such as green, and the highlighting/visual border 706 may even alternate between presentation and non-presentation. Furthermore, the border 706 as highlighted may be, e.g., half an inch wide along the periphery of the front-facing portion of the display on which images are presentable and thus does not establish part of the bezel of the display 700 itself. Thus, the border 706 as highlighted may draw a user's attention to the display 700, e.g., should the user be looking at a different display such as is illustrated in FIG. 3. The circle 704 may provide further aid to the user for the user to visually locate the current display location of the mouse cursor 702.

The indications described above in reference to FIG. 7 may continue to be presented, e.g., until a threshold non-zero amount of time expires or until the user is identified as looking at the mouse cursor, looking within a threshold display distance of the mouse cursor, looking at the correct display on which the mouse cursor is presented, etc.

Before moving on in the detailed description, also note that in addition to or in lieu of presenting the border 706 as described above, the display on which the mouse cursor is presented may itself be controlled to alternate between presenting content and not presenting any content as another way to draw the user's attention to display being used to present a mouse cursor. For example, the device may turn the relevant display off and on in successive fashion until a threshold non-zero amount of time expires or until the user is identified as looking at the mouse cursor, looking within a threshold display distance of the mouse cursor, looking at the correct display on which the mouse cursor is presented, etc.

Figure 8:
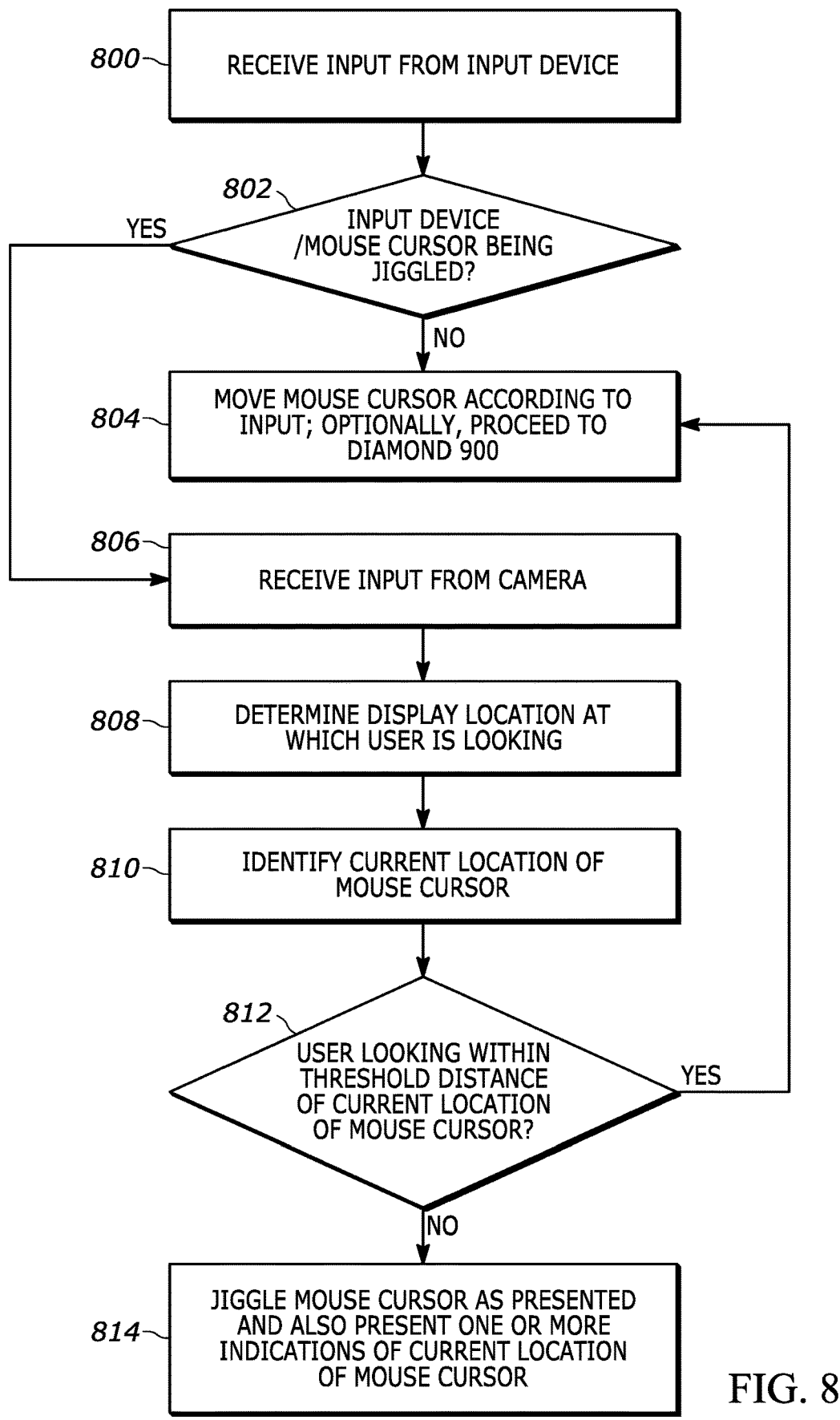
FIGS. 8 and 9 are flow charts of example algorithms that may be executed by a device consistent with present principles.

Continuing the detailed description in reference to FIG. 8, it shows example logic that may be executed by a computing device such as the system 100 in accordance with present principles. Beginning at block 800, the device may receive input from an input device with which it communicates, such as a mouse or track ball input device, that indicates a user command to move a mouse cursor or pointer. The logic may then proceed to decision diamond 802 where the device may determine whether the input indicates the input device or mouse cursor itself being jiggled. Again, jiggling may be established by a user moving the mouse cursor or pointer back and forth between at least two directions based on movement of the input device, with changes in direction occurring at least within a threshold non-zero time of each other.

Responsive to a negative determination at diamond 802, the logic may proceed to block 804 where the device may move the mouse cursor about one or more displays according to the input while declining to present an indication of a current display location of the mouse cursor. In some embodiments, from block 804 the logic may proceed to diamond 900 as will be described shortly, while in other embodiments the logic may revert back to block 800.

However, responsive to an affirmative determination at diamond 802, the logic may either proceed directly to block 814 as will be described below or first proceed to block 806 where the device may receive input from a camera consistent with present principles. For example, the device may receive input from the camera 191 or camera 312 described above. The logic may then proceed to block 808 where the device may execute eye tracking software and, using the input from the camera received at block 806, determine a location on a display at which the user is looking. The logic may then move to block 810 where the device may identify and track the current location of the mouse cursor itself as presented on the display as the user moves it via the input device.

From block 810 the logic may proceed to decision diamond 812 where the device may determine, based on the current location of the mouse cursor and the location at which the user is looking, whether the user is looking at a display location within a threshold non-zero distance of the current location of the mouse cursor. Distance may be in the x-y plane established by the front of the display itself and the threshold may be one inch, for example.

Responsive to an affirmative determination at diamond 812, the logic may revert back to block 804 where the device may move the mouse cursor about one or more displays while declining to present an indication of a current display location of the mouse cursor and then revert back to block 800. However, responsive to a negative determination at diamond 812, the logic may move to block 814 where the device may jiggle the mouse cursor as presented on the display by moving it back and forth in accordance with the user's input via the input device while also presenting one or more indications of the current location of the mouse cursor consistent with present principles. From block 814 the logic may then revert back to block 800 and proceed therefrom.

Figure 9:
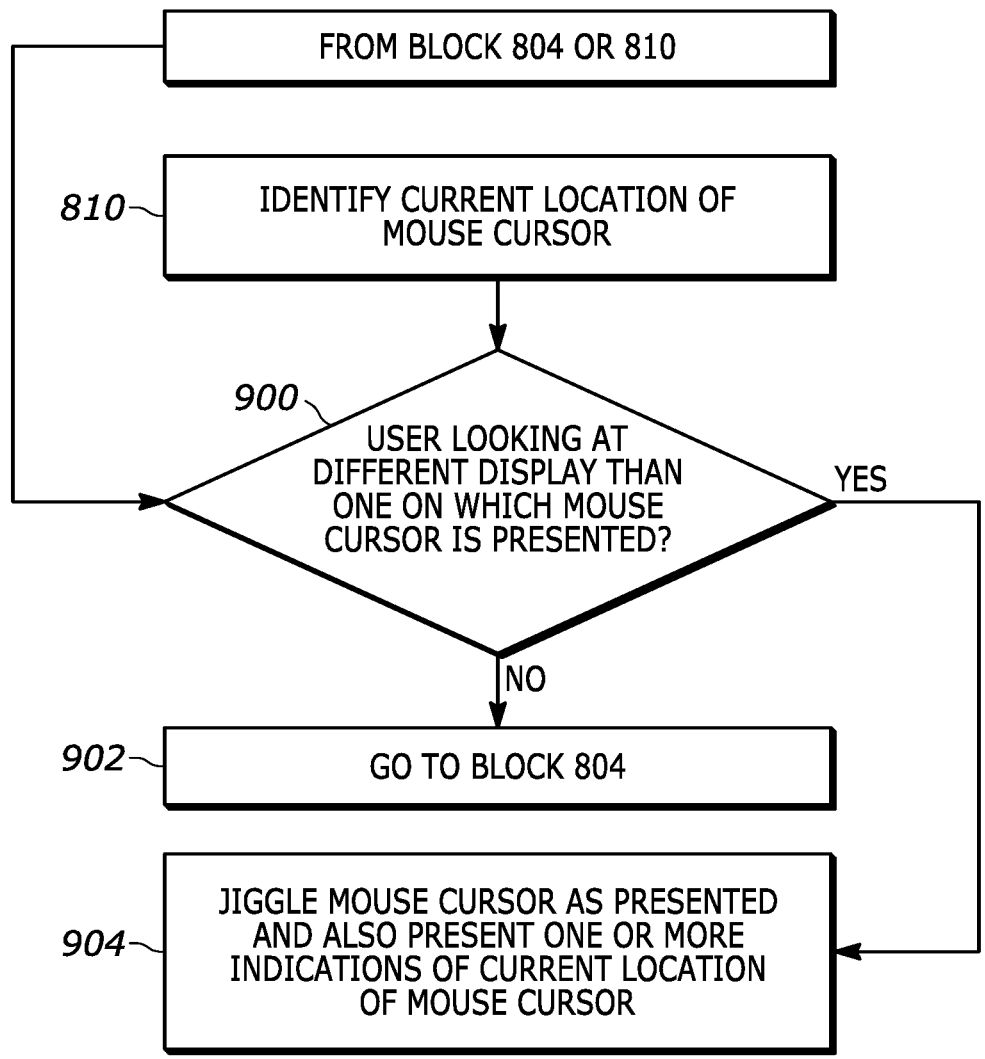

FIG. 9 shows additional logic that may be executed by the device in conjunction with the logic of FIG. 8. Decision diamond 900 may be arrived at from block 804 or block 810, for example, and may be executed when two discrete displays are being used by the user and controlled by the device itself. Thus, it is to be understood that the logic of FIG. 9 may be executed based on detection by the device of the user jiggling the mouse cursor, but also based on detection of the user moving the mouse cursor other than by jiggling. In any case, at decision diamond 900 the device may determine, based on the camera input received at block 806, whether the user is looking at a different display than the one on which the mouse cursor is being presented.

Responsive to a negative determination, the logic may proceed to block 902 where the logic reverts back to block 804 to continue moving the mouse cursor itself according to the user input received at block 800. However, responsive to an affirmative determination at diamond 900, the logic may instead move to block 904. At block 904 the device may jiggle the mouse cursor as presented on the display by moving it back and forth in accordance with the user's input via the input device while also presenting one or more indications of the current location of the mouse cursor consistent with present principles. From block 904 the logic may then revert back to block 800 and proceed therefrom.

Figure 10:
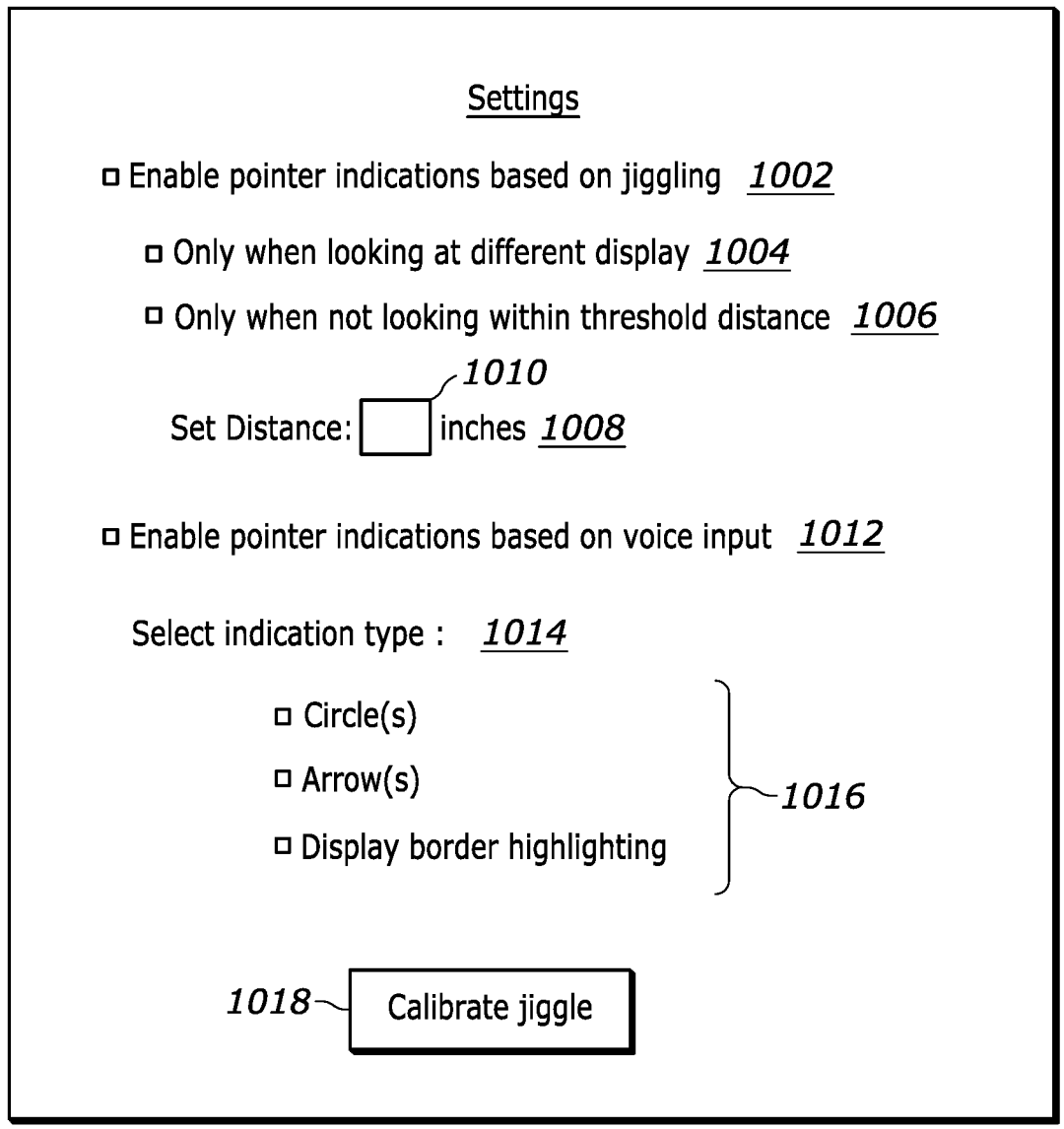
FIG. 10 shows an example graphical user interface (GUI) for a user to configure one or more settings of a device undertaking present principles.

Now in reference to FIG. 10, it shows an example graphical user interface (GUI) 1000 presentable on one or more displays of a computing device configured to undertake present principles. It is to be understood that the GUI 1000 may be presented for a user to configure one or more settings of the device for the device to operate consistent with present principles. It is to be further understood that each of the options or sub-options to be described below may be selected based on a user directing touch input or pointer input to the adjacent check box to select that check box.

As shown in FIG. 10, the GUI 1000 may include a first option 1002 that is selectable to configure the device to undertake present principles. For example, the option 1002 may be selected to configure the device to present indications of mouse cursor locations consistent with present principles, undertake the logic of FIGS. 8 and 9, etc. Beneath the option 1002 may be one or more sub-options, such as a sub-option 1004 that is selectable to configure the device to only present indications of mouse cursor locations as described herein when a user is identified by the device as looking at a different display than the one on which the mouse cursor is currently presented.

A sub-option 1006 may also be presented on the GUI 1000 and be selectable to configure the device to only present indications of mouse cursor locations as described herein when a user is determined to not be looking within a threshold distance of the current location of the mouse cursor. If desired, the GUI 1000 may even include a setting 1008 at which a user may specify the threshold distance for the device to use via input to input box 1010.

Still further, the GUI 1000 may include an option 1012 that may be selectable to configure the device to present indications of mouse cursor locations as described herein responsive to identifying, based on receipt of input from a microphone, that a user is speaking words as detected by the microphone that indicate that the user cannot locate the current location of the mouse cursor on the display. Voice recognition, keyword recognition, and/or an artificial intelligence model with at least one neural network may be used for such purposes, where the model may be used for making such inferences based on the microphone input. For example, "where's the mouse" as spoken by the user may lead to an inference by the model that the user cannot locate the current location of the mouse cursor, and in response the device may present one or more indications of the current location of the mouse cursor consistent with present principles.

The GUI 1000 may further include a setting 1014 at which the user may select one or more types of indications of the current location of a mouse cursor for the device to use consistent with present principles. Sub-options 1016 are presented for a user to select one or more particular indication types to use and it is to be understood that while only a few types are shown in FIG. 10 for illustration, any of the indications/types disclosed herein may be listed under the setting 1014 as a sub-option 1016.

Last, in some embodiments the GUI 1000 of FIG. 10 may include a selector 1018. The selector 1018 may be selectable to initiate a training process where a user may be prompted to provide input device input of one or more jiggles that the device is to recognize consistent with present principles. Separate jiggle inputs the user provides during this training process may then be used as training samples to train an artificial neural network already preconfigured more generally by a developer or the device's manufacturer to better-recognize the user's jiggle inputs as such.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor;

at least one display accessible to the at least one processor; and storage accessible to the at least one processor and comprising instructions executable by the at least one processor to:

identify jiggling of a mouse cursor;

responsive to the identification of the jiggling of the mouse cursor, identify a current location of the mouse cursor on at least one display;

receive input from a camera in communication with the at least one processor;

identify, based on the input from the camera, a location of the at least one display at which a user is looking;

determine, based on the location of the at least one display at which the user is looking, whether the user is looking at a display location at least within a threshold distance of the current location of the mouse cursor;

responsive to a determination that the user is looking at a display location outside of the threshold distance of the current location of the mouse cursor, present at least one indication on the at least one display of the current location of the mouse cursor, the at least one indication comprising something other than the mouse cursor itself; and responsive to a determination that the user is looking at a display location at least within the threshold distance of the current location of the mouse cursor, decline to present the at least one indication.

2. The device of claim 1, wherein the at least one indication comprises at least one graphical object.

3. The device of claim 2, wherein the at least one graphical object comprises a circle that animates to reduce its radius around a center of the circle, the center of the circle established by at least a portion of the mouse cursor.

4. The device of claim 2, wherein the at least one graphical object comprises plural concentric circles of different radii that together either animate to expand their radii about a center established by at least a portion of the mouse cursor or animate to reduce their radii about a center established by at least a portion of the mouse cursor.

5. The device of claim 2, wherein the at least one graphical element comprises at least one arrow different from the mouse cursor and that is larger than the mouse cursor.

6. The device of claim 5, wherein the at least one arrow flashes between presentation and non-presentation on the at least one display.

7. The device of claim 5, wherein the at least one arrow is presented in a first color different from one or more colors in which the mouse cursor is presented.

8. The device of claim 1, comprising the camera.

9. The device of claim 8, comprising an input device that controls the mouse cursor.

10. The device of claim 1, comprising an input device that controls the mouse cursor.

11. The device of claim 1, wherein the jiggling comprises back and forth movement of the mouse cursor.

12. The device of claim 1, wherein the input from the camera is first input from the camera, wherein the at least one display comprises discrete first and second displays, and wherein the instructions are executable by the at least one processor to:

receive second input from the camera;

identify, based on the second input from the camera, that the user is looking at the first display;

identify that the mouse cursor is currently presented on the second display; and responsive to identification of movement of the mouse cursor and based on the identifications that the user is looking at the first display and that the mouse cursor is currently presented on the second display, present the at least one indication on the second display.

13. The device of claim 12, wherein the movement of the mouse cursor does not comprise jiggling.

14. The device of claim 12, wherein the second input from the camera is different from the first input from the camera.

15. The device of claim 12, wherein the second input from the camera is the same as the first input from the camera.

16. The device of claim 1, wherein the at least one display comprises discrete first and second displays, wherein the mouse cursor is currently presented on the first display, and wherein the instructions are executable by the at least one processor to:

highlight a border of the first display as at least part of the at least one indication.

17. The device of claim 16, wherein the highlighting of the border is performed in addition to presentation of at least one graphical object that at least in part establishes the at least one indication.

18. A method, comprising:

identifying back and forth movement of a pointer currently presented on one of a first display and a second display, the first and second displays being different from each other;

identifying that a user is looking at one of the first display and the second display;

responsive to identifying that the user is looking at a different display than the one on which the pointer is presented, presenting at least one indication of a current location of the pointer, the at least one indication comprising something other than the pointer itself; and responsive to identifying that the user is looking at the same display as the one on which the pointer is presented, declining to present the at least one indication of the current location of the pointer.

19. A computer readable storage medium (CRSM) that is not a transitory signal, the computer readable storage medium comprising instructions executable by at least one processor to:

identify back and forth movement of a pointer currently presented on one of a first display and a second display, the first and second displays being different from each other;

identify that a user is looking at one of the first display and the second display;

responsive to identifying that the user is looking at a different display than the one on which the pointer is presented, present at least one indication of a current location of the pointer, the at least one indication comprising something other than the pointer itself; and responsive to identifying that the user is looking at the same display as the one on which the pointer is presented, decline to present the at least one indication of the current location of the pointer.

20. The CRSM of claim 19, wherein the at least one indication comprises at least one graphical element.

* * * * *